Feb. 8, 1966  W. STRAUSS  3,233,288
MOLDING APPARATUS
Filed March 21, 1963  2 Sheets-Sheet 1

INVENTOR.
WILLIAM STRAUSS
BY Arthur H. Seidel
ATTORNEY

Feb. 8, 1966   W. STRAUSS   3,233,288
MOLDING APPARATUS
Filed March 21, 1963   2 Sheets-Sheet 2

INVENTOR.
WILLIAM STRAUSS
BY
ATTORNEY

3,233,288
MOLDING APPARATUS

William Strauss, Philadelphia, Pa., assignor, by mesne assignments, to Pennsalt Chemicals Corporation, Philadelphia, Pa., a corporation of Pennsylvania
Filed Mar. 21, 1963, Ser. No. 266,885
7 Claims. (Cl. 18—30)

This application is a continuation-in-part of my copending application Serial No. 193,487 filed May 9, 1962, and entitled Molding Apparatus.

This invention relates to a molding apparatus, and more particularly, to a molding apparatus having means for delivering preplasticized material to a mold at precise intervals in order to eliminate polymerization of the material prior to its transfer.

A wide variety of machines for plasticizing plastic materials have been proposed heretofore. Preplasticizer units have been proposed wherein the plastic material is first conditioned in a separate unit and then delivered to a transfer cylinder from which the material is injected into the mold cavity. Another type of a preplasticizer unit is disclosed in Patent 2,734,226 wherein the plastic material is preplasticized within the transfer cylinder itself. The present invention is a combination of these two types.

Many methods of preplasticizing the material within the transfer cylinder have been tried. Since plastic is a poor conductor, heating by conduction is very inefficient. Heating by friction, on the other hand, is very efficient. However, thermosetting plastics become unworkable if heat is applied for too long a period of time. In this case, polymerization takes place and the material is unusable. It is, therefore, important that the material be uniformly heated for a uniform period of time. Past attempts to heat thermosetting materials by friction, have not proved satisfactory. This was due primarily to non-uniformity of heating, lack of positive means of removing the molded parts and runners, and non-uniform cycle times.

The present invention avoids and overcomes the above and other disadvantages of prior art practices by the provision of a unique reciprocating screw which keeps the material to be molded in motion for uniform preheating. Additionally, the apparatus of the present invention completely and automatically removes the molded parts and runners. An operator is not needed as the apparatus of the present invention will exactly duplicate its cycle of operation in order to eliminate polymerization of the material prior to its transfer.

In the apparatus of the present invention, a down-acting clamping mechanism and bottom transfer unit is provided. The bottom transfer unit includes a transfer pot adapted to receive the barrel of the reciprocating screw feeding the molding compound. A transfer ram is provided below the transfer pot to advance the material into the runners and molds of the press and simultaneously prevent the flow of any additional moulding compound into the transfer pot. By automatically cycling the movement of the down-acting clamping mechanism, the screw, and the transfer ram, equipment is provided which will assure exact duplication of cycle time so that a predetermined amount of molding compound will be heated for a predetermined amount of time and delivered to the mold cavities only when the clamp ram is in the closed position.

As an added feature of the basic molding apparatus of the present invention, there is also provided means for purging thermoset material from the screw, when an error occurs in the molding cycle. Three methods of purging the material have been disclosed. One method is to merely shut off the flow of thermoset material, retract the extruder from the transfer pot, and allow the screw to run dry. The second is to shut off the flow of thermoset material, retract the extruder, and introduce thermoplastic material, which will surround the thermoset resin and purge it from the machine. The third method is to reciprocate the screw to the rear until the threads thereon are exposed, and then rotate the screw in a reverse direction. Once the problem that caused the shut down has been corrected, the apparatus may be re-cycled by introducing thermoset material to the screw.

When operating the apparatus disclosed in my above mentioned application with certain thermosetting plastic resins, I have found that there is a tendency for the plastic resin to become overheated by the preplasticizing operation. This has resulted in partial polymerization before the resin is transferred to the mold cavity. Attempts to solve this problem by reducing the temperature setting on heater coils surrounding the screw cylinder failed since these coils only effect the surface temperature of the plastic resin and must be sufficiently hot so as not to absorb heat from the plastic resin during preplasticizing. In accordance with the present invention, I have solved this problem by providing means for cooling the transfer pot and the end of the screw cylinder adjacent thereto.

It is an object of the present invention to provide a novel molding apparatus.

It is another object of the present invention to provide a novel molding apparatus which is adapted to uniformly friction heat a uniform amount of material to be molded.

It is another object of the present invention to provide a novel molding apparatus having a rotating and reciprocally mounted screw for delivering a predetermined amount of preplasticized material to a transfer pot without permitting partial polymerization of the material.

It is another object of the present invention to provide a completely automatic molding apparatus for molding thermosetting plastic resins without partial polymerization of the resins prior to entry of the resins into a mold cavity.

It is another object of the present invention to provide a molding apparatus with novel means for purging the screw and its cylinder of polymerized thermosetting plastic resins.

Other objects will appear hereinafter.

For the purpose of illustrating the invention, there is shown in the drawings a form which is presently preferred; it being understood, however, that this invention is not limited to the precise arrangements and instrumentalities shown.

Referring to the drawing in detail, wherein like numerals indicate like elements, there is shown in FIGURE 1 a molding apparatus in accordance with the present invention designated generally as 10.

Figure 1:
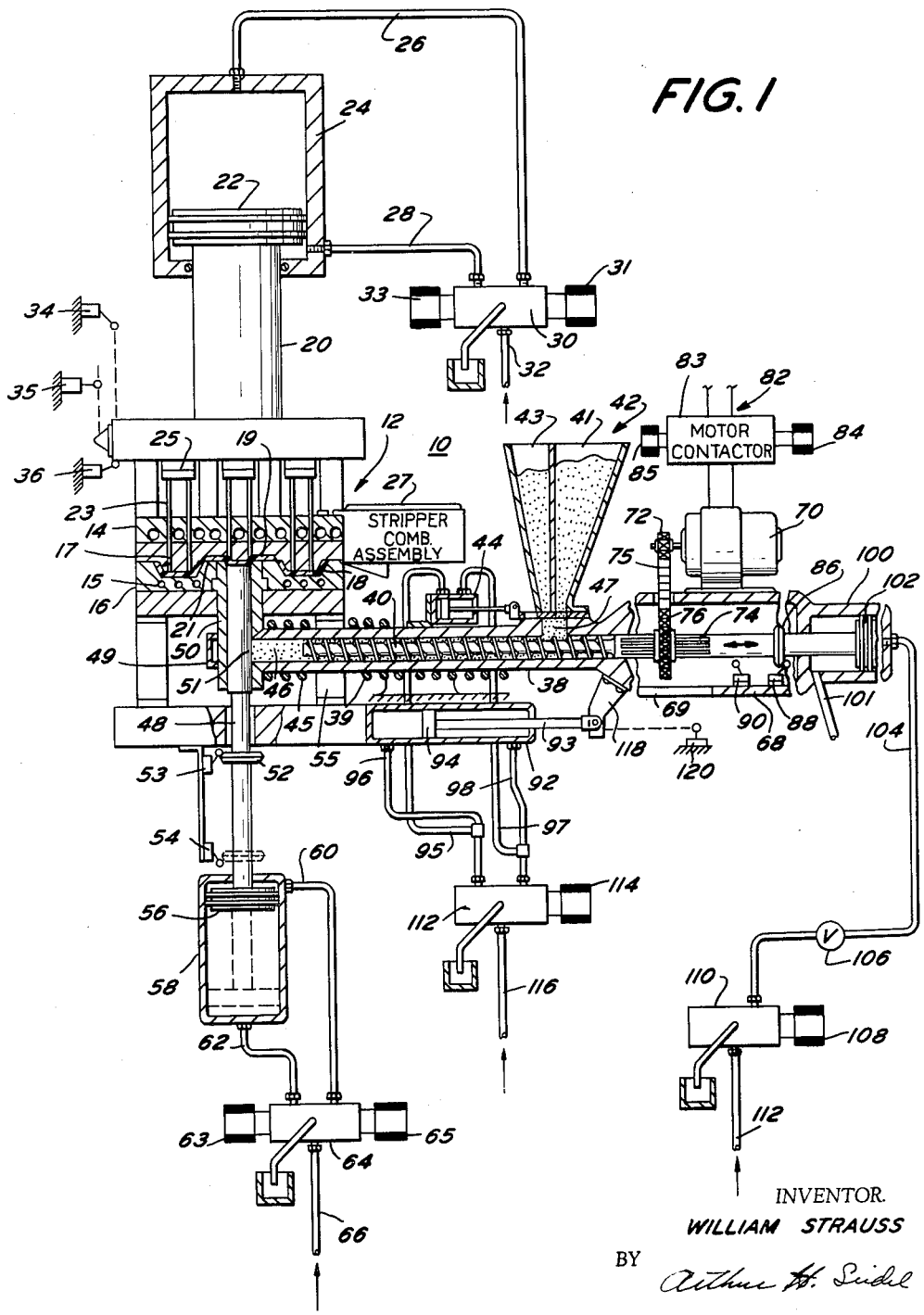
FIGURE 1 is a longitudinal sectional view of the molding apparatus of the present invention with a portion thereof being shown schematically.

The molding apparatus 10 includes an upper platen 12 having an upper mold half 14 and a lower platen having a lower mold half 16. The mold halves 14 and 16 are appropriately sculptured so as to provide mold cavities 17 and 18 and mold runners 19 and 21. The mold half 14 is mounted for reciprocal movement toward and away from the mold half 16. Mold halves 14 and 16 are provided with heating coils 15.

Ejection cross head 25 supports knockout pins 23. The pins 23 extend downwardly through the upper half 14 into the cavities and runners between the upper half 14 and the lower half 16. The pins 23 operate with a stripper comb assembly 27 to remove the molded parts and runners from the press when the press is in the opened position. The operation of the stripper comb assembly and the knockout pins is better explained in U.S. Patent 2,582,891, entitled "Automatic Molding Press" and invented by William Strauss.

The reciprocatory movement of the mold half 14 is effected by means of a clamp ram 20. One end of the ram 20 is secured to the mold half 14 and the other end of the ram 20 is provided with a piston 22. The piston 22 is disposed within a cylinder 24. The ram 20 extends through a hole in one wall of the cylinder 24 and seal means are provided around said hole.

Conduits 26 and 28 communicate with opposite ends of the cylinder 24. The conduits 26 and 28 are connected to a valve 30. The valve 30 is a sliding spool supply and exhaust valve which is commercially available. The spool in the valve is reciprocated to supply fluid from inward conduit 32 to either the conduit 26 or to conduit 28 in response to solenoids 31 and 33 on opposite ends of the spool.

The apparatus 10 of the present invention includes a press-opened limit switch 34, a press-closed limit switch 36 and a safety timer reset limit switch 35. The switches 34, 35 and 36 are selectively operable by movement of the upper half 14. The significance of the switches 34, 35 and 36 will be made clear hereinafter in the discussion of the wiring diagram illustrated in FIGURE 2.

The material which is to be injected into the mold cavities 17 and 18 is measured and preplasticized within an extruder cylinder 38. A screw 40 having ribs helically disposed thereon is rotatably and reciprocally mounted within the cylinder 38. The material to be plasticized and injected into the mold cavities 17 and 18 is fed into the cylinder 38 from a hopper 42 through a port 47 in the wall of the cylinder 38. The hopper 42 has two compartments 41 and 43. Compartment 41 contains a thermosetting molding compound. Compartment 43 may be empty or may contain a purging compound such as thermoplastic material.

The compartments 41 and 43 are selectively cooperative with the port 45 by reason of hopper shifting cylinder 44. The hopper shifting cylinder 44 in the operating position places the compartment 41 in cooperative relation with the port 45 so as to allow thermosetting molding compound to flow into the extruder 38. The material from the hopper compartment 41 is fed by the rotation of the screw 40 into the accumulation zone 46 which is located at one end of the cylinder 38 adjacent a transfer pot 50. Heating coils 39 surround the cylinder 38. Coils 39 are at a sufficient temperature to prevent the cylinder 38 from absorbing heat from the molding compound. Cooling coils 45 surround the accumulation zone 46 to prevent partial polymerization of the molding compound therein due to heat generated by the screw 40.

A transfer ram 48 is reciprocally disposed within the bore of the transfer pot 50 and extends in a direction substantially perpendicular to the longitudinal axis of cylinder 38. An opening 51 in a side wall of the transfer pot 50 communicates with the accumulation zone 46. When the transfer ram 48 is in its lowermost position (as shown in dotted lines), the screw 40 feeds the preplasticized material into the transfer pot 50. The transfer ram 48 is adapted to move upwardly so as to close the port 51 and feed the material in the transfer pot to the runners 19 and 21 and their respective mold cavities 18 and 17. Hence, the ram 48 acts as a valve element for port 51.

When the ram 48 is in the position illustrated, its upper end is subjected to the heat imparted to the mold half 16 by coils 15. To prevent this heat from being conducted to the molding compound in zone 46, cooling channel 49 is provided on the transfer pot 50 opposite to and in line with the zone 46. When the molding compound is phenol formaldehyde, the temperature of the fluid medium in coil 45 and channel 49 will be approximately 170–190° F.

A trip ring 52 extending radially outwardly from the axis of the transfer ram 48 is provided for cooperation with a transfer ram advanced limit switch 53 and a transfer ram returned limit switch 54. The operation of these limit switches will be described below with reference to FIGURE 2.

The end of the transfer ram 48 is provided with a piston 56 disposed within a cylinder 58. Conduits 60 and 62 remote from the cylinder 58 are connected to a supply and exhaust valve 64. A movable valve element within the valve 64 is operated by means of solenoids 63 and 65 so as to control flow from a supply conduit 66 to the conduits 60 and 62.

A housing 68 extends from the righthand end of the cylinder 38 in FIGURE 1. Housing 68 has an opening 69 in a bottom wall thereof and may completely lack a bottom wall if desired. An electric drive motor 70 is supported by the housing 68. The motor 70 is provided with an output shaft having a sprocket 72 fixedly secured thereto. The sprocket 72 is meshingly engaged with and drives a chain 75. Chain 75 extends around a sprocket 76. The sprocket 76 is mounted on a splined portion 74 on the screw 40. It will be understood that suitable splined bushings are provided for the sprocket 76 so that such sprocket 76 is maintained in meshing engagement with the chain 75 and the splined portion 74.

Electric power is supplied to the motor 70 by means of a suitable supply source 82. In the present invention, the screw drive motor 70 is reversible. The motor contactor 83 is controlled by solenoids 84 and 85. Actuation of the solenoid 84 is operative to connect and disconnect the motor contactor 83 to the drive motor 70 during normal operation. Actuation of solenoid 85 by a manual switch will drive motor 70 in reverse.

The screw 40 is provided with an annular trip ring 86. The trip ring 86 is fixedly secured to the screw 40 and is operatively disposed so as to actuate either screw stop limit switch 88 or screw advanced limit switch 90 under predetermined conditions.

A cylinder 100 extends from the housing 68. A piston 102 fixedly secured to the righthand end of the screw 40 is disposed within the cylinder 100. Cylinder 100 is of sufficient length so that screw 40 may be reciprocated to a position wherein several threads are exposed when viewed through opening 69. A conduit 104 is connected through a back pressure valve 106 to a supply and exhaust valve 110.

The back pressure valve 106 is adapted to provide free flow from the exhaust and supply valve 110 to the conduit 104 while providing resistance flow in the back direction from the conduit 104 to the exhaust and supply valve 110. A movable element within the valve 110 is operated in response to a solenoid 108 so as to control flow of motivation fluid from the supply conduit 112 to the valve 106 or to place valve 106 in communication with the atmosphere.

Figure 2:
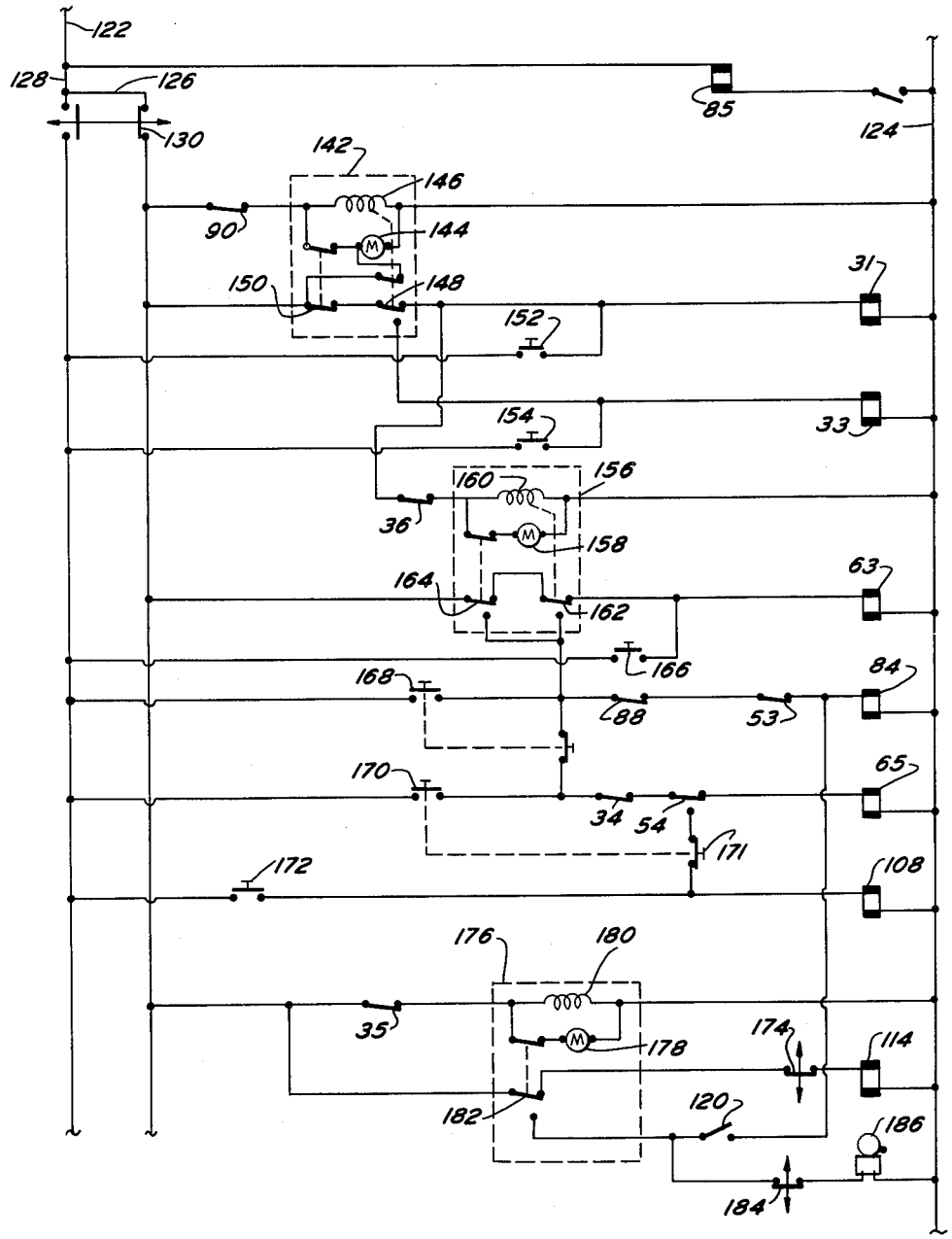
FIGURE 2 is a schematic illustration of the wiring diagram for the apparatus illustrated in FIGURE 1.

The remaining elements of the present invention are more clearly illustrated in FIGURE 2. As shown in FIGURE 2, a wiring diagram is provided which includes wires 122 and 124 disposed in parallel and extending from a suitable direct current source (not shown).

Automatic operation line 126 is connected to line 122 and in parallel with hand operation line 128. Selective double contact switch 130 is operative to connect either the line 126 or the line 128 to the source of direct current. A screw advanced limit switch 90 is connected in series with a coil 146 of a clamp ram timer 142 across wires 126 and 124. The clamp ram timer 142 includes a timer motor 144, double throw switch 150 and double switches 148. The clamp ram timer 142 starts timing upon momentary contact of the screw advanced limit switch. The screw advanced limit switch is shown in the closed position. This occurs when the screw trip ring 86 contacts the screw advanced limit switch 90 as discussed with reference to FIGURE 1. The switch is opened when the screw is not advanced. One contact of each of the switches 150 and 148 is in series with solenoid 31 across the wires 124 and 126. When the clamp ram timer times out, switch 148 moves to a second position placing the one switch of double throw switch 150 in series with the new position of the one switch of double throw switch 148 in series with solenoid 33 across the lines 124 and 126.

For hand operation, a hand press-close push button 152 is connected in series with press-close solenoid 31 across lines 128 and 124. Hand press-open push button 154 is placed in series with press-open solenoid 33 across the lines 128 and 124.

When the clamp ram timer 142 is timing, press closed solenoid 31 is being energized. This signal is also supplied through a press closed limit switch 36 to a coil 160 of the transfer ram timer 156. The press closed limit switch 36 is shown in the closed position. This occurs when the upper platen 12 actuates the switch 36 as shown in FIGURE 1. When the upper platen 12 moves upwardly, the switch 36 opens.

The transfer ram timer 156 is only operative while a signal is being supplied to the timer. The transfer ram timer 156 includes a coil 160, timer motor 158, double throw switch 164 and switch 162. When the transfer ram timer 156 is timing, a switch of the double throw switch 164 is in series with the switch 162 and the transfer ram advance solenoid 63 across lines 126 and 124. When the transfer ram timer 156 times out, the switch 164 then closes a circuit between line 126 and screw stop limit switch 88, transfer ram limit switch 53 and screw rotate motor control solenoid 84. The screw stop limit switch 88 is closed when the accumulation chamber 46 is not filled with the preplasticized material. When the trip ring 86 abuts the screw stop limit switch 88, the contacts open. The transfer ram limit switch 53 is adapted to be closed when the transfer ram is in the advanced or uppermost position. When trip ring 52 is not in contact with the limit switch 53, the contacts open.

A hand transfer ram advance push button 166 is placed in series with the transfer ram advance solenoid 63 across the lines 128 and 124. A hand screw rotate push button 168 is placed in series with the screw stop limit switch 88, the transfer ram advanced limit switch 53, and the screw rotate motor control solenoid 84 across lines 124 and 128. The hand screw rotate push button 168 has two contacts operated by it. The first pair of contacts was discussed above. The second pair of contacts operated by the push button 168 is oppositely operative from the first pair of contacts and adapted to connect the transfer ram timer 156 through a press-open limit switch 34 and a transfer ram returned limit switch 54 to energize the transfer ram return solenoid 65.

The press-open limit switch 34 is in the closed position when the upper platen 12 abuts the limit switch 34. In any other position of the upper platen 12, the contacts of the switch 34 are opened. The transfer ram return limit switch 54 has a first set of contacts which are bridged when the transfer ram trip ring 52 is not in abutment with the limit switch 54. These contacts are in series with the solenoid 65. When the trip ring 52 abuts the limit switch 54, the limit switch 54 bridges a second pair of contacts.

The second contacts of the transfer ram returned limit switch 54 are in series with a pair of contacts 171 of a push bottom and the screw advance solenoid 108. A second oppositely operative pair of contacts 170 is mechanically connected to the contacts 171 and is electrically in series with the press-open limit switch 34, the transfer ram returned limit switch 54 and the transfer ram return solenoid 65 across the lines 128 and 124. A hand screw advance push button 172 is connected in series with the screw advance solenoid 108 across the lines 128 and 124.

The safety timer reset limit switch 35 is in series with a coil 180 of the safety purge timer 176 across lines 126 and 124. The safety timer reset limit switch, when moved by the downward travel of upper plate 12, starts the timing of the safety purge timer 176 by closing its contacts. Switch 35 can only be actuated by such downward movement of upper platen 12. The safety purge timer 176 is operative only when a direct current supply is being fed to it.

The safety purge timer 176 includes the coil 180, a timer motor 178 and switch 182. While the safety purge timer is timing, the switch 182 connects the extruder retract solenoid 114 through a hand extruder engage push button 174 to the direct current source. If the safety purge timer should time out, the switch 182 would be connected through an on-off switch 184 to an alarm 186. The switch 182 would also connect through an extruder retracted limit switch 120, the solenoid 84 between the wires 124 and 126.

The extruder retract solenoid 114 is operative when energized to maintained the extruder engaged with the transfer pot. When the solenoid 114 is de-energized, the extruder retracts from the pot. The extruder retracted limit switch 120 is normally open when the extruder is not retracted from the pot. When the arm 118 engages the extruder retracted limit switch 120, the contacts close.

The operation of the apparatus 10 is as follows:

Selector switch 130 is disposed in the position for automatic operation as illustrated in FIGURE 2. The starting conditions for the automatic operation are (a) the clamp ram 22 is raised so that the press is opened; (b) the transfer ram is in the returned position opening port 51 to the extruder 38; (c) the screw 40 is in the advanced position.

Under these conditions, the clamp ram timer starts to time as the screw advanced limit switch 90 closes its contacts momentarily. Since the clamp ram timer is timing, the press-close solenoid 31 is energized to start the feeding of liquid behind the piston 22 through the conduit 26 to close the press. When the press is fully closed, the press-close limit switch 36 bridges its contacts and transfer ram timer 156 starts timing. When transfer ram timer 156 times, it is operative through switch 162 to energize the transfer ram advance solenoid 63. The transfer ram moves as fluid is fed behind the piston 56 through conduit 62. Moving upwardly, the transfer ram closes port 51 and feeds the material to fill the mold runners and cavities 17–21.

When the transfer ram timer 156 times out, the transfer ram advance solenoid 63 is de-energized and the screw rotate motor control solenoid 84 is energized. This occurs as the transfer ram advanced limit switch 53 is closed as is the screw stop limit switch 88. The press-open limit switch 34 is open so that the signal from the transfer ram timer 156 is not supplied to any other part of the circuit. The screw 40 feeds the material forward from the hopper 41 and plasticizes the material by the rotation of the screw. As the material is extruded forward, the screw 40 will be moved to the rear against the back pressure created in conduit 104 by valve 106. Since the transfer ram is in the up position, the material will be accumulated in the accumulation zone 46. This occurs until the trip ring 86 on the screw 40 engages the screw stop limit switch 88. When the screw stop limit switch 88 is engaged, its contacts open, de-energizing the screw rotate motor control solenoid 84 to stop the screw drive motor 70.

At this point, the clamp ram timer 142 times out, de-energizing the press-close solenoid 31 and energizing the press-open solenoid 33. When the upper platen 12 contacts the press-open limit switch 34, its contacts are bridges so as to energize the transfer ram return solenoid 65. Energization of the transfer ram return solenoid 65 places pressurized fluid through the conduit 60 to the front of the piston 56 forcing it to retract from the mold.

If the system of the present invention is adapted to be used with a stripper comb assembly 27, an auxiliary automatic ejection cycle must be sequenced at this point into the circuit shown in FIGURE 2. Such a cycle and the circuitry therefore, is more adequately shown in the above mentioned patent to W. Strauss, 2,582,891.

The transfer ram trip ring 52 engages the transfer ram returned limit switch 54. This de-energizes the solenoid 65 and since contacts 171 are bridged, the screw advance solenoid 108 is energized. The screw advance solenoid 108 is operative to supply pressure to the rear of the piston 102 forcing the material in the accumulation zone 46 into the transfer pot 50. The screw 40, when fully advanced, has its trip ring 86 abutting the screw advanced limit switch 90. This re-energizes the clamp ram timer 142 and the cycle will repeat.

If there has been any breakdown in the automatic equipment, such that the complete operation from press-open position to press-open position has increased from the desired amount, the safety purge timer 176 will operate. The safety purge timer 176 has a timing period which is set slightly longer than the over-all time of a complete automatic cycle. The safety timer reset limit switch opens momentarily each time the press closes. If for any reason the safety purge timer 176 times out, the switch 182 will be operative to de-energize the extruder retract solenoid 114, allowing pressurized fluid to be fed through conduit 96 behind the piston 94. This pressure will cause the piston to move to the right, extracting the extruder 38 from the transfer pot 50. The extruder 38 is mounted on suitable supports for such horizontal movement. Adjacent the port 51 are openings 55 in the bottom of the mold half 16 which are adapted to receive any material purged from the accumulation zone 46.

The conduit 96 is also in communication with the rear of the hopper shifting cylinder 44, and when the solenoid 114 is de-energized, fluid is passed through the conduit 95 to the rear of the piston in the hopper shifting cylinder 44. This causes the supply hopper to shut off molding compound from the compartment 41 and to feed a thermoplastic purging compound in the compartment 43 to the port 47, cooperative with the screw 40. As was stated previously, the compartment 43 need not contain a purging compound if dry purging is desired.

When the solenoid 114 is de-energized, the switch 182 is connected so as to set off the alarm 186. Thus, the timing out of the safety purge timer 176 causes simultaneous retraction of the extruder 38, shifting of the hopper 42, and the sounding of the alarm 186.

When the extruder 38 is fully retracted, the arm 118 abuts the extruder retracted limit switch 120 completing a circuit with the safety purge timer 176 to the screw rotate motor control solenoid 84. This causes the screw drive motor 70 to rotate the screw 40 so as to purge the accumulation chamber of the thermosetting material therein.

At all times during the operation, a coolant medium will flow through coil 45 and channel 49 to prevent polymerization of the molding compound in zone 46. If desired, the ram 48 may be internally cooled in the region of port 51.

The rate of return of screw 40 can be controlled by varying the back pressure on piston 102 from zero to any desirable amount. Thereafter, the screw 40 will be rotated dry with the motor 70 operating in reverse.

When the apparatus 10 has been inoperative for a period of time or otherwise has polymerized molding compound on the screw 40 or the inner surface of cylinder 38, the same may be removed as follows. Limit switch 88 will be adjusted to an inoperative position. Screw 40 will be reciprocated to the right in FIGURE 1 by introducing fluid through conduit 101 until a portion of the screw thread is visible through opening 69.

Reverse operation of the screw 40 causes all polymerized molding compound to be mechanically scraped off the threads, discharged into housing 68, and out opening 69 into a suitable scrap receptacle. Further purging, especially in zone 46 at the front end of cylinder 38, may be attained thereafter by returning the screw to its normal disposition, running the screw in its normal direction of rotation, and introducing material from compartment 43 with subsequent discharge of the same from the front end of cylinder 38. This method of purging polymerized molding compound is simple, quick and does not require the apparatus 10 to be disassembled.

All the operations discussed above for automatic cycling of the apparatus may be accomplished through the use of the hand operated push buttons shown in FIGURE 2. The hand operations analogous to the automatic operation discussed above follow the same steps as the automatic operation.

In place of elements 104–112 inclusive, an accumulator may be provided to cause forward movement of screw 40. However, this is not preferred.

The screw stop limit switch 88 is preferably mounted for adjustment in a direction parallel to the longitudinal axis of screw 40. Since molding compound ceases to accumulate in zone 46 when the contacts of switch 88 are opened as described above, it will be obvious to those skilled in the art that the amount of material which accumulates in zone 46 may be varied by adjusting the position of switch 88. For example, the amount of such accumulation is increased as the switch 88 is moved to the right in FIGURE 1.

The present invention may be embodied in other specific forms without departing from the spirit or essential attributes thereof and, accordingly, reference should be made to the appended claims, rather than to the foregoing specification as indicating the scope of the invention.

I claim:

1. In molding apparatus comprising an extruder cylinder, a screw rotatably disposed within said cylinder, a reversible motor means coupled to said screw, means for introducing a molding compound into said cylinder for delivery of the molding compound by the screw in one direction in said cylinder, means for exposing at least a portion of the thread on said screw at the end of said cylinder which is opposite the delivery end, whereby said screw and cylinder may be purged of molding compound by rotating said screw in a direction opposite to the direction of rotation when said screw is delivery said compound.

2. Apparatus in accordance with claim 1 including means for selectively closing the delivery end of said cylinder remote from said opposite end to prevent discharge of molding compound from said cylinder.

3. Apparatus in accordance with claim 1 wherein said means for exposing at least a portion of the thread includes means for reciprocating said screw in an opposite direction in said cylinder to a position where at least a portion of one thread on said screw is exposed at said opposite end.

4. In a molding apparatus comprising a transfer pot, a ram reciprocally disposed within said pot, an extruder cylinder communicating with said pot in one position of said ram, said ram interrupting communication between said cylinder and pot in a second position of said ram, a rotatable screw within said extruder cylinder for preplasticizing molding compound within said cylinder and feeding the preplasticized material into an accumulation zone in said cylinder adjacent said pot, a reversible motor coupled to said screw, means for reciprocating said screw within said cylinder, reciprocation of said screw in one direction increasing the size of said accumulation zone, reciprocation of said screw in an opposite direction being capable of feeding the preplasticized material from said zone into said transfer pot, means for reciprocating said screw in timed relation with reciprocation of said ram, and means for controlling the temperature of molding compound within said accumulation zone to prevent premature polymerization thereof.

5. A molding apparatus comprising a platen for supporting a separable mold having a mold cavity, a transfer pot having one end adjacent said platen, a transfer delivery means reciprocably mounted within said pot to deliver material in said pot to the mold cavity, an extruder cylinder communicating with said pot, means for plasticizing molding material within said extruded cylinder and feeding the plasticized material to said transfer pot in timed relation with the reciprocation of said delivery means, said means for plasticizing material and feeding the plasticized material to the transfer pot including a screw rotatably disposed within said cylinder, a reversible motor means coupled to said screw, means for introducing a molding compound into said cylinder for delivery of the molding compound by the screw in one direction in said cylinder, means for exposing at least a portion of the thread on said screw at the end of said cylinder which is opposite the delivery end, and means for cooling the end of the cylinder adjacent said pot to prevent premature polymerization of the plasticized material prior to transfer to the mold cavity.

6. A molding apparatus in accordance with claim 5 wherein said means for exposing at least a portion of the thread includes means for reciprocating said thread in an opposite direction in said cylinder to a position where at least a portion of one thread on said screw is exposed at said opposite end.

7. In a molding apparatus comprising a transfer pot, a transfer delivery means reciprocably disposed within said pot for delivery molding compound from said pot to a mold cavity, a cylinder disposed within said pot for deliverying molding compound from said pot to a mold cavity, a cylinder disposed at an angle with respect to said pot, means for plasticizing material within said cylinder and feeding plasticized molding compound to said pot in timed relation with the reciprocation of said delivery means, means for cooling accumulated molding compound within said cylinder adjacent pot, and means for purging said cylinder, said means for plasticizing material and feeding the plasticized material to the transfer pot, and said purging means, including a screw rotatably disposed within said cylinder, a reversible motor means coupled to said screw, means for introducing a molding compound into said cylinder for delivery of the molding compound by the screw in one direction in said cylinder, means for reciprocating said screw in an opposite direction in said cylinder to a position wherein at least a portion of one thread on said screw is exposed at one end of said cylinder, whereby said screw and cylinder may be purged of molding compound by rotating said screw in a direction opposite to the direction of rotation when said screw is delivering said compound.

References Cited by the Examiner

UNITED STATES PATENTS

| | | | |
|---|---|---|---|
| 2,090,434 | 8/1937 | Thalmann | 18—12 |
| 2,102,328 | 12/1937 | Morin et al. | 264—39 |
| 2,595,455 | 5/1952 | Heston | 18—12 |
| 2,653,915 | 9/1953 | Elgin et al. | 18—12 X |
| 2,734,226 | 2/1956 | Willert. | |
| 2,862,239 | 12/1958 | Pollard et al. | 264—39 |
| 2,916,769 | 12/1959 | Baigent | 18—30 |
| 2,916,769 | 12/1959 | Baigent | 18—30 |
| 3,023,455 | 3/1962 | Geier et al. | 18—30 X |
| 3,068,521 | 12/1962 | Gaspar et al. | 18—30 |
| 3,080,610 | 3/1963 | Baigent | 18—30 |
| 3,133,316 | 5/1964 | Arpajian | 18—30 |
| 3,146,287 | 8/1964 | Kleine-albers | 18—30 X |

FOREIGN PATENTS 909,449 10/1962 Great Britain.

J. SPENCER OVERHOLSER, *Primary Examiner.*

ALEXANDER H. BRODMERKEL, WILLIAM J. STEPHENSON, *Examiners.*